United States Patent [19]
Sudo

[11] Patent Number: 6,047,198
[45] Date of Patent: *Apr. 4, 2000

[54] COMMUNICATION TERMINAL EQUIPMENT

[75] Inventor: Fukuharu Sudo, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/814,324

[22] Filed: Mar. 11, 1997

[30] Foreign Application Priority Data

Mar. 19, 1996 [JP] Japan ................................ P08-090080

[51] Int. Cl.[7] .............................. H04B 1/38; H04M 1/00; H04M 3/42; H04M 3/00
[52] U.S. Cl. .......................... 455/566; 455/414; 455/418; 455/550
[58] Field of Search ..................................... 455/566, 419, 455/414, 415, 416, 417, 418, 425, 550, 575, 90, 506; 379/142, 387

[56] References Cited

U.S. PATENT DOCUMENTS

| | | |
|---|---|---|
| 5,377,261 | 12/1994 | Baals et al. . |
| 5,404,396 | 4/1995 | Brennan . |
| 5,485,511 | 1/1996 | Iglehart et al. . |
| 5,715,311 | 2/1998 | Sudo et al. ................................ 379/428 |
| 5,758,295 | 5/1998 | Ahlberg et al. ........................ 455/566 |
| 5,794,142 | 8/1998 | Vanttila et al. ......................... 455/419 |
| 5,841,855 | 11/1998 | Davidson et al. ....................... 379/387 |

*Primary Examiner*—Dwayne D. Bost
*Assistant Examiner*—Raymond B. Persino
*Attorney, Agent, or Firm*—Jay H. Maioli

[57] ABSTRACT

A communication terminal enabling a control command to be accurately and easily made up. On account of the provision of controller not only for successively displaying predetermined items to allow a user to select and decide desired items but also for displaying the input instruction of a predetermined information type to allow the user to input a predetermined information type, thereby making up a control command on the basis of the relevant selected result and the predetermined information type, a user can accurately and easily make up a control command only by inputting the instructed type of information while successively selecting desired items.

12 Claims, 7 Drawing Sheets

| ADDITIONAL SERVICES | SC | SIA | SIB | SIC |
|---|---|---|---|---|
| NUMBER NOTIFICATION | 30 | | BS | |
| NON-CONDITIONAL RECEIVE TRANSFER | 21 | TRANSFER NO. | BS | |
| BUSY RECEIVE TRANSFER | 67 | TRANSFER NO. | BS | |
| OUTSIDE OR POWER-OFF RECEIVE TRANSFER | 62 | TRANSFER NO. | BS | |
| NO-RESPONSE RECEIVE TRANSFER | 61 | TRANSFER NO. | BS | TIMER VALUE |
| TRANSMIT RESTRICTION | 33 | PASSWORD | BS | |
| INTERNATIONAL CALLING TRANSMIT RESTRICTION | 331 | PASSWORD | BS | |
| EXCEPT-HPLMN INTERNATIONAL CALLING TRANSMIT RESTRICTION | 332 | PASSWORD | BS | |
| RECEIVE RESTRICTION | 35 | PASSWORD | BS | |
| ROAMING RECEIVE RESTRICTION | 351 | PASSWORD | BS | |
| WHERE, "BS" REPRESENT BASIC SERVICE GROUP. | | | | |

FIG. 1 (RELATED ART)

| CONTROL COMMANDS | COMMAND CODES |
|---|---|
| Activation | *SC*SI# |
| Deactivation | #SC*SI# |
| Interrogation | *#SC*SI# |
| Registration | **SC*SI# OR *SC*SI# |
| Erasure | ##SC*SI# |
| WHERE, SI=SIA*SIB*SIC. | |

FIG. 2 (RELATED ART)

FIG. 8A
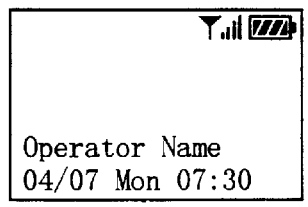

FIG. 8B
CALL THE
CONTROL-COMMAND
MAKING SCREEN
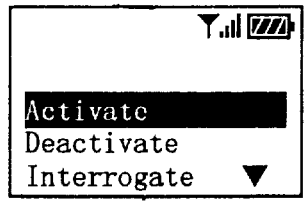

FIG. 8C
SELECT A COMMAND
BY USING
THE JOG DIAL
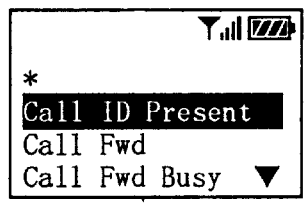

FIG. 8D
SELECT AN
ADDITIONAL
SERVICE BY USING
THE JOG DIAL
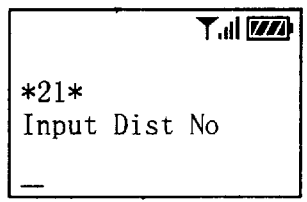

FIG. 8E
INPUT THE TRANS-
FER TELEPHONE
NO. BY USING
THE NUMERIC KEYS
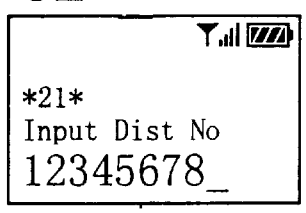

TURN ON
THE "*" KEY OR
CLICK
THE JOG DIAL

FIG. 8F
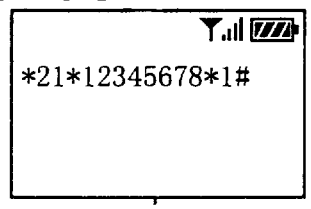

FIG. 8G
SELECT A BASIC
SERVICE GROUP BY
USING THE JOG DIAL
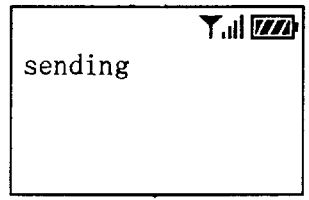

FIG. 8H
SEND THE COMMAND TO
THE NETWORK BY TURN-
ING ON THE SEND KEY
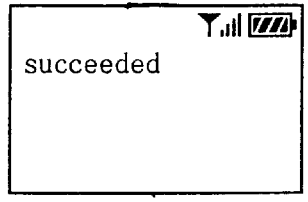

FIG. 8I
A RESPONSE IS
PRESENT FROM
THE NETWORK
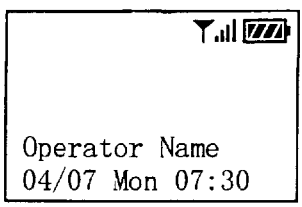

FIG. 8J
RETURN TO THE IDLE
STATE UNDER ACTION
OF THE TIMER

COMMUNICATION TERMINAL EQUIPMENT

BACKGROUND OF THE INVENTION

1. Field of the Invention

This invention relates to communication terminal equipment, and more particularly, is applicable to cellular phone equipment of the global system for mobile communications (GSM) standardized in Europe.

2. Description of the Related Art

In recent years, the prevalence of cellular phone equipment is significant, which has been accompanied with a wide variety of functions added to a cellular phone equipment. In addition, not only phone call service is provided from the system side but various additional services have been also provided. With the GSM system as mentioned above, for example, additional services as shown in FIG. 1 are provided. Incidentally, the additional services of the GSM are disclosed in detail in standard literature, such as "European digital cellular telecommunication system (Phase 2): Man-Machine Interface (MMI) of the Mobile Station (MS) (GSM 02.30)", published from the European Telecommunication Standard Institute (ETSI).

As shown in FIG. 1, the additional services in the GSM system include "Number notification", "Non-conditional receive transfer", "Busy receive transfer", "Outside or power-OFF receive transfer", "No-response receive transfer", "Transmit restriction", "International calling transmit restriction", "Except-HPLMN international calling transmit restriction", "Receive restriction" and "Roaming receive restriction".

Out of these, "Number notification" is a service for noticing the phone number of the calling side at the receipt. On the other hand, "Non-conditional receive transfer", "Busy receive transfer", "Outside or power-off receive transfer" and "No-response receive transfer" are all services for transferring the received call to the other communication terminal equipment that has already been registered, divided into four services according to the operating condition of a cellular phone equipment.

Further, "Transmit restriction", "International calling transmit restriction" and "Except-HPLMN international calling transmit restriction", are all services for restricting a calling operation, divided into three services according to three conditions for use of non-conditional, international and except-HPLMN (home country) international calling. Furthermore, "Receive restriction" and "Roaming receive restriction" are all services for restricting a receive operation, divided into two services according to two conditions for use of non-conditional and roaming time (when removed into a service area of other trader and receiving a service) receive.

Such services, however, are usable ordinarily by sending various commands as shown in FIG. 2 from a cellular phone equipment to the base station equipment (to be accurate, the provider side of additional services, what is called, the network side). When a desired service is used, the service setting request command called Activation shown in FIG. 2 is sent. On the other hand, when the use of an additional service is completed, a service completion command called Deactivation shown in FIG. 2 is transmitted. This enables the use of the additional service that has thus far been used to be completed.

Meanwhile, when various types of introduction information concerning additional services are received, an information providing command called Interrogation shown in FIG. 2 is sent. This enables various types of introduction information concerning additional services to be received. When transfer destinations for various transfer services are registered, a registration command called Registration shown in FIG. 2 is transmitted. In addition, when the transfer destination registered is canceled, an erase command called Erasure shown in FIG. 2 is transmitted. This enables the registered transfer destination to be canceled.

Here, a method for the use of additional services by these commands will be described below by referring to embodiments. When using the additional service of "Non-conditional receive transfer", it is only necessary to put the service code (SC: code representing a target additional code) of "Non-conditional receive transfer" shown in FIG. 1 and a supplementary indices (SI: various parameter codes needed for the receipt of additional services) into the command code of Activation shown in FIG. 2 and to transmit them together to the network side.

To be specific, "*" is inputted by pressing the "*" key, then "21", service code (SC) for "Non-conditional receive transfer", is inputted by pressing numeric keys and "*" is inputted again by pressing the "*" key. Next, as supplementary indices (SI), the codes representing the "Transfer destination number", "*" and a -basic service group (BS) are successively inputted and "#", the last code of a command, is inputted. If the send key is pressed after inputting the Activation command of "Non-conditional receive transfer" in this manner, the command code is transmitted to the base station equipment and "Non-conditional receive transfer" is set. After the setting, this enables the additional service of "Non-conditional receive transfer" to be used in this cellular phone equipment.

Similarly, other additional services can be used or terminated for use by entering the control command while referencing the service code and the supplementary index for that additional service shown in FIG. 1, and finally pressing the send key to send the control command.

With such a conventional method for the use of additional services, a user himself must make up the control command of an additional service on the basis of service codes or supplementary indices. This control-command making operation is complicated as seen from the above description, so that errors in making a control command or the like occur, thereby preventing the additional service often from being used. In practice, it is almost difficult for a user to keep all these complicated control commands, service commands or the like in mind and consequently it is natural that errors in mating a command occur.

As a method for solving this problem, it may be thought of to carry a simplified handbook about in which control commands, or service codes and supplementary indices for an additional service are described, but this method is considered to be unfavorable in use for a user and insufficient as a solution.

SUMMARY OF THE INVENTION

In view of the foregoing, an object of this invention is to provide a communication terminal equipment enabling a control command to be accurately and easily made up.

The foregoing object and other objects of the invention have been achieved by the provision of a control means for successively displaying predetermined items on display means, thus allowing a user to manipulate first input means so as to successively select and decide predetermined items, and moreover for displaying the input instruction of a predetermined type of information on display means, thus allowing a user to manipulate second input means so as to input the predetermined type of information and make up and transmit a control command on the basis of the relevant selected result and predetermined type of information.

In this way, the provision of control means not only for displaying predetermined items and allowing a user to successively select and decide desired items by manipulating the first input means but also for displaying the input instruction of a predetermined type of information and allowing the user to input a predetermined type of information and make up a control command on the basis of the relevant result and predetermined types of information enables a user to make up a control command only by successively selecting desired items inputting the instructed type of information.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 1 is a table showing the types of additional services;

FIG. 2 is a table showing the types of control commands;

FIGS. 8A to 8J are schematic diagrams showing the screen images of a control-command making screen.

DETAILED DESCRIPTION OF THE EMBODIMENT

Preferred embodiments of this invention will be described with reference to the accompanying drawings:

(1) General constitution (1-1) Main equipment body

Figure 3:
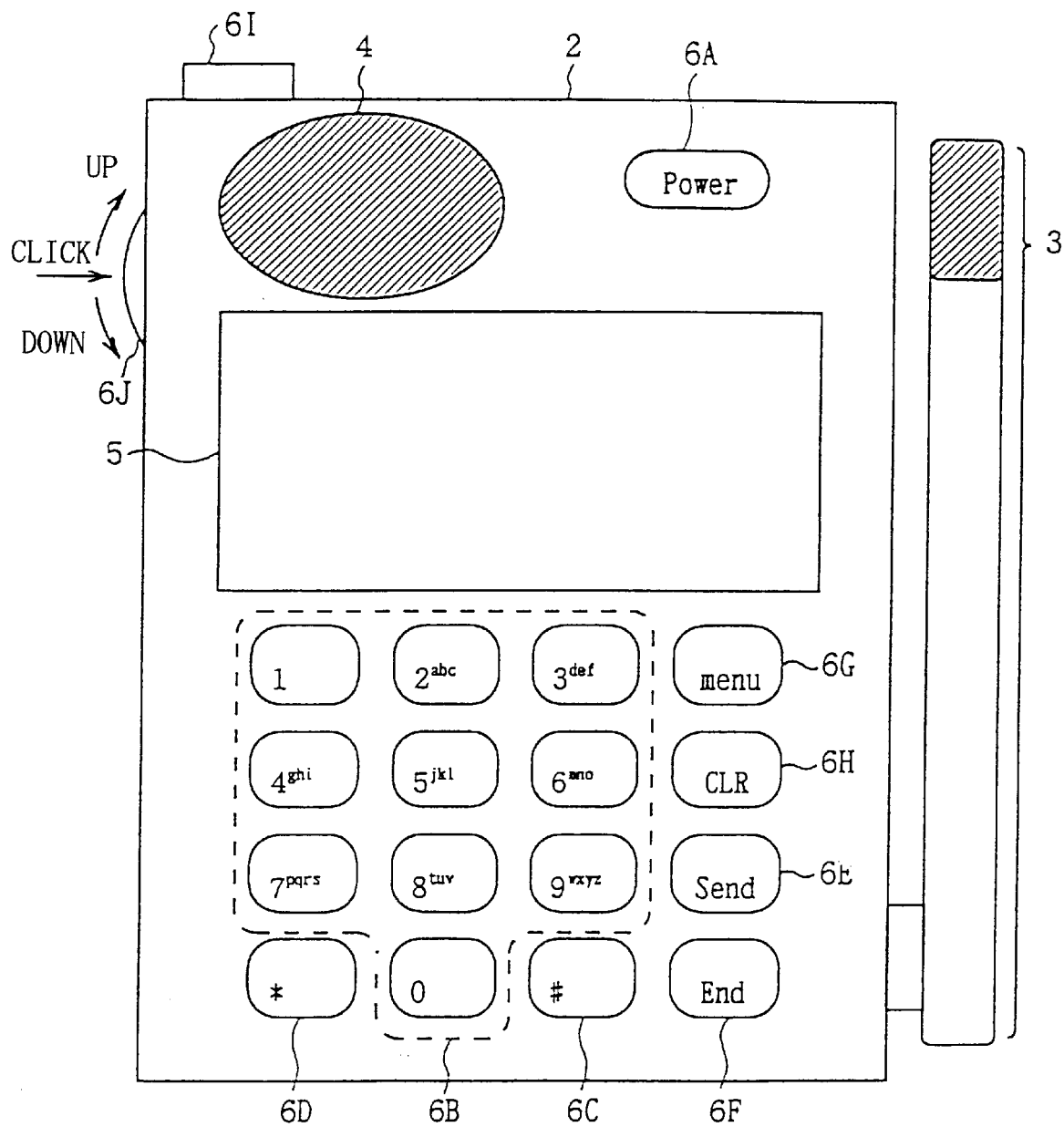
FIG. 3 is schematic diagram showing the general configuration of a cellular phone according to one embodiment of the present invention.
Figure 4:
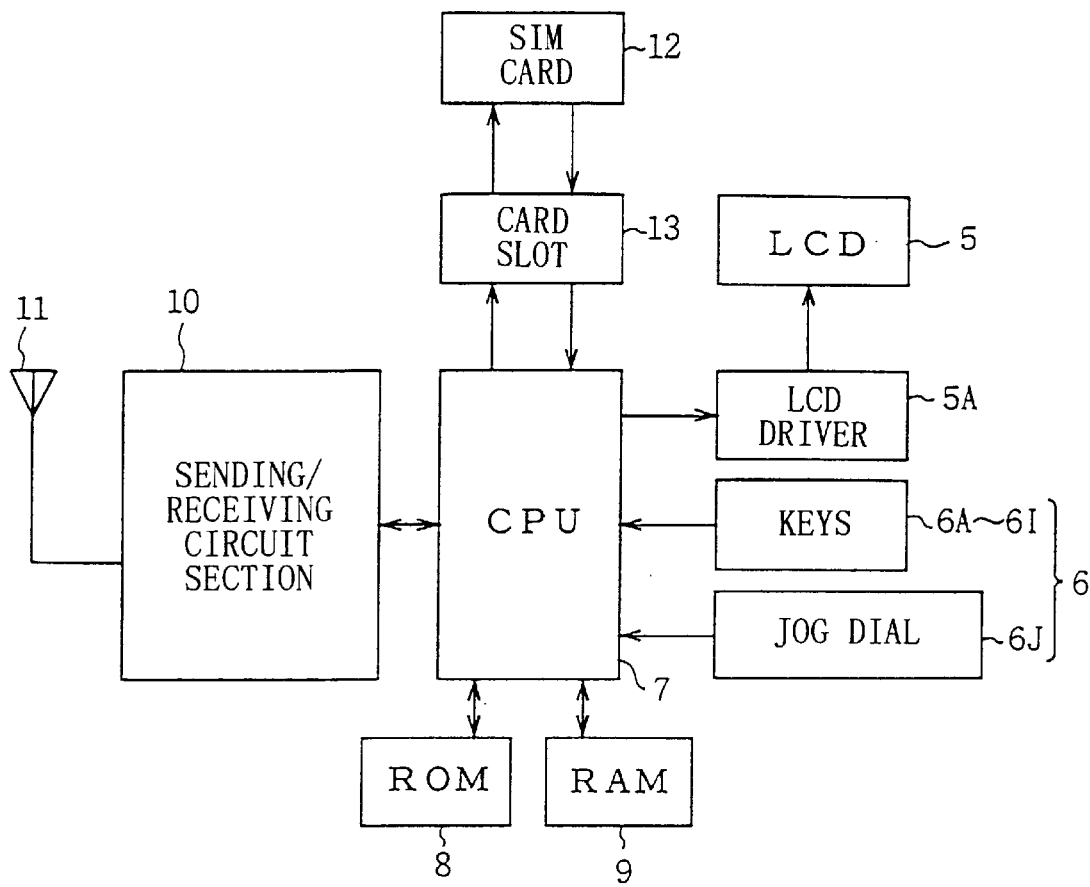
FIG. 4 is a block diagram showing the circuit configuration provided inside the cellular phone.

First, referring to FIGS. 3 and 4, the general configuration and circuit configuration of a cellular phone equipment 1 to which the present invention is applied will be described. This cellular phone equipment 1 roughly comprises a main equipment body 2 and an arm microphone 3 attached thereto in such a manner as to be freely rotated (opened and closed). Accordingly, except during use, the cellular phone equipment 1 can be made smaller in size by closing the arm microphone 3.

In addition to the function to control ON-HOOK or OFF-HOOK in linkage with the on or off operation, this arm microphone 3 is equipped with the function to invalidate the keys other than the specified keys in the off state (referred to as KEYLOCK function hereinafter). Incidentally, this KEYLOCK state is so arranged as to be releasable by opening the arm microphone 3.

Provision of such a KEYLOCK function can prevent the cellular phone equipment 1 against misoperation caused by pressing a operation key by mistake when put into a pocket or bag.

On the other hand, the main equipment body 2 comprises various operation keys and a processing circuit. On the surface of the main equipment body 2, in addition to a speaker 4 paired with the arm microphone 3, a liquid crystal display (LCD) 5 and a plurality of operation keys 6 to which various functions are assigned are provided, and further a central processing unit (CPU) 7 with these used as its input/output devices is built in the main equipment body 2.

The CPU 7 controls the LCD 5 via a liquid display driver 5A and displays various types of information in fonts of an appropriate size. In addition, the CPU 7 controls a sending/receiving circuit section 10 and sends/receives various type of information (e.g., audio signals or various control signals, or a control command in using an additional service) from/to the base station equipment via an antenna 11 connected thereto. Such a CPU 7 is so arranged as to operate in accordance with the program stored in a read only memory (ROM) 8 or the data read in a random access memory (RAM) 9.

Incidentally, a card socket 13 is connected to the CPU 7 so that, from a subscriber ID card 12 (subscriber identity module (SIM) card in the case of this embodiment) inserted therein, all types of management information concerning subscribers are read out and used for the control.

Meanwhile, a matrix array of pixels, for example, comprising 32 dots longitudinally×97 dots transversely, is used for the LCD 5 so that a type of information can be displayed in two types of fonts by using these dots, one of which is a small font for displaying a character in 7 dots longitudinally×5 dots transversely and the other of which is a large font for displaying a character in 15 dots longitudinally×8 dots transversely. Thus, the use of a small font enables characters to be displayed in 4 characters longitudinally×16 characters transversely, whereas that of a large font enables characters to be displayed in 2 characters longitudinally×10 characters transversely.

Here in principle, a large font is used to display the characters inputted by a user, whereas a small font is used to display a message or the like of the equipment side. However, if the number of characters inputted by the user exceed a predetermined number (e.g., twenty characters or thereabouts), the font is automatically switched in size from a large font to a small font.

The provision of such switching function enables a user to input the inputted characters while checking the input content in large characters, thereby reducing misinputs so long as the number of inputted characters is small. Even when the number of characters is large, the input information concerning one and the same item can be checked on one screen, so that the input content can be easily comprehended.

(1-2) Operation keys

Subsequently, the operation keys 6 provided in the equipment main body 2 will be described. With this embodiment, the operation keys 6 comprise the following ten keys: a power supply key 6A, numeric keys 6B for "0" to "9", a "#"key 6C, a "*" key 6D, a send key 6E, an end key 6F, a menu key 6G, a clear key 6H, a recording key 6I and a jog dial 6J. Among these, the operation keys 6A to 6H are placed on the front face of the equipment main body 2, the remaining two operation keys 6I and 6J are placed on the side face of the equipment main body 2.

The principal functions assigned to individual operation keys are as follows: First, the power supply key 6A is a key used to supply power to an internal circuit of the equipment main body 2 so that power is supplied by the first depress manipulation and the supply of power is turned off by the second depress manipulation. If no personal ID number (PID) is not inputted from a user during thirty seconds after power is supplied by the power supply key 6A, the CPU 7 detects this to automatically turn off the power supply, so that it can be prevented that the power remains being on due to a misoperation.

Next, the ten numeric keys 6B will be described. In addition to the input of numerals, these ten numeric keys 6B are used for that of alphabets. With this embodiment, a plurality of alphabets are assigned to each of eight numeric keys "2" to "9" except "0" and "1" keys, thereby enabling alphabets to be inputted. For example, "a" to "c" are assigned to the "2" key, "d" to "f" are assigned to the "3" key and such other alphabets are assigned to other keys similarly.

The input of alphabets is so arranged that the first character can be inputted by pressing one and the same key once, the second character can be inputted by pressing it twice and the third character can be inputted by pressing it three times in regular order. Furthermore, aside from serving for the selection of display items, when pressing a predetermined numeral during the display of a telephone list, this numeric keys 6B switches the screen to the item corresponding to the numeral and is also enabled to move the cursor indication to the relevant item.

The send key 6E is a key for inputting the start of operation in calling operation made to the telephone number manually inputted with the numeric keys 6B or the destination telephone number selected on the telephone directory screen and further is also used when inputting the transmission instruction of a control command in utilizing an additional service to be provided or when calling the past dial history or the like.

The end key 6F is a key for inputting the end-of-communication instruction. Incidentally, the end-of-communication instruction is enabled to be inputted also by closing the arm microphone 3.

The menu key 6G is a key serving to switch the screen which to make the LCD 5 display between the initial screen and the menu screen. Generally, with a cellular phone equipment 1, the time of day or the like is displayed as the initial screen, but depressing the menu key 6G in this state can switch the display to the menu screen for displaying various setting items. In addition, when a predetermined manipulation is performed in this state by using the jog dial 6J mentioned later, the menu screens can be switched one by one as if the pages were turned. Furthermore, depress of the clear key 6H in this state would enable the menu screen to return to the preceding screen one by one as if the pages were turned.

Meanwhile, depress of the menu key 6G during such display of the menu screen would enable the initial screen to be recovered simultaneously even if any menu screen is displayed.

In addition, to the menu key 6G, the function serving as only a operation key capable of releasing the KEYLOCK state is assigned. That is, as mentioned above, the equipment is in the KEYLOCK state generally when the arm microphone 3 is closed, but depressing the menu key 6G will enable the equipment to be released from the KEYLOCK state and proceed to the key active state.

The recording key 6I is a key employed when recording the conversation during the communication and when reproducing the recorded one and is mounted on the opposite side to the arm microphone 3 in the top face of the relevant equipment main body 2 so as operable with the hand holding the equipment main body 2 as it stands.

Finally, the jog dial 6J having a central function among ten operation keys will be described. The jog dial 6J is provided near the speaker 4 at the upper part opposite the arm microphone 3 in the side face of the equipment main body 2 so as operable with the hand holding the equipment main body 2 as it stands similar to the recording key 6I.

Figure 5:
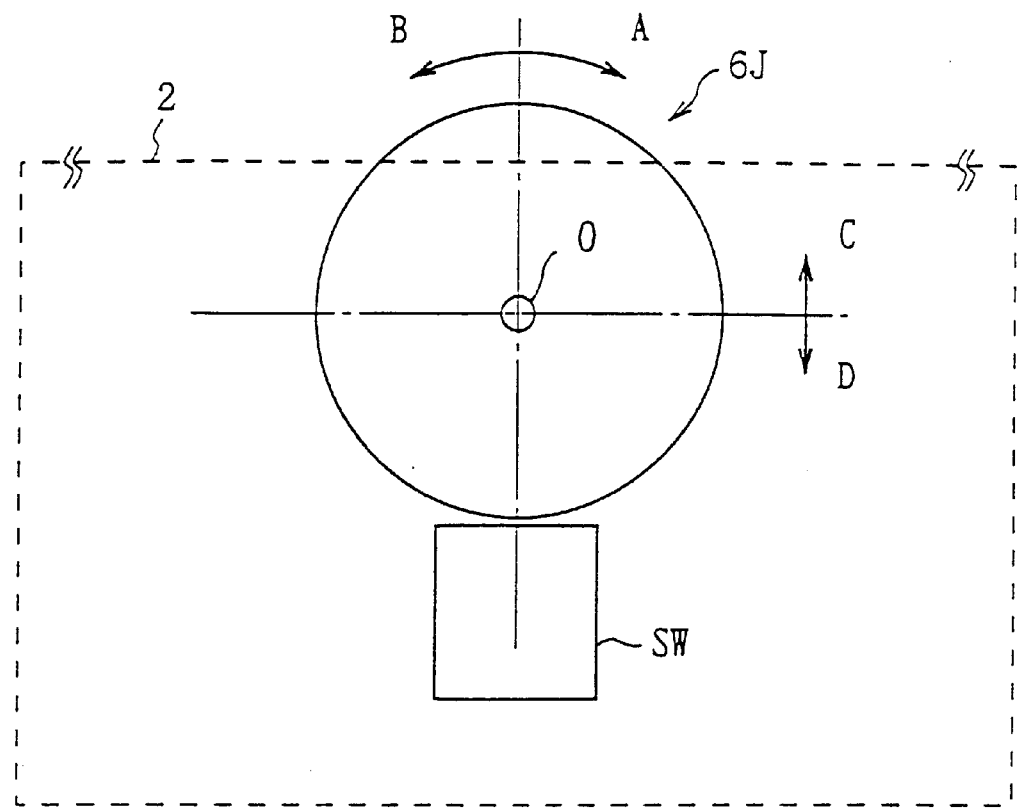
FIG. 5 is schematic diagram showing the outline mechanism of a jog dial.

The jog dial 6J is so designed as to independently operate in the circumferential and radial directions (arrows A and B), respectively. As shown in FIG. 5, the jog dial 6J comprises a disc member (constituting a rotary encoder) to rotate in a circle around the rotation axis O, a slide plate (not shown) slidable in a radial direction (arrows C and D) and a slide switch SW.

Incidentally, the slide plate and the slide switch SW are energized in the direction of the arrow C. The rotation axis O is fixed to the slide plate and when the jog dial 6J is pushed in the direction of the arrow D, the rotary encoder slides together with the slide plate as a unit to depress the slide switch SW so that the equipment can be controlled in the ON state. By detecting the on or off state of the slide switch SW, the CPU 7 discriminates whether the jog dial 6J was clicked or not.

Figure 6A:
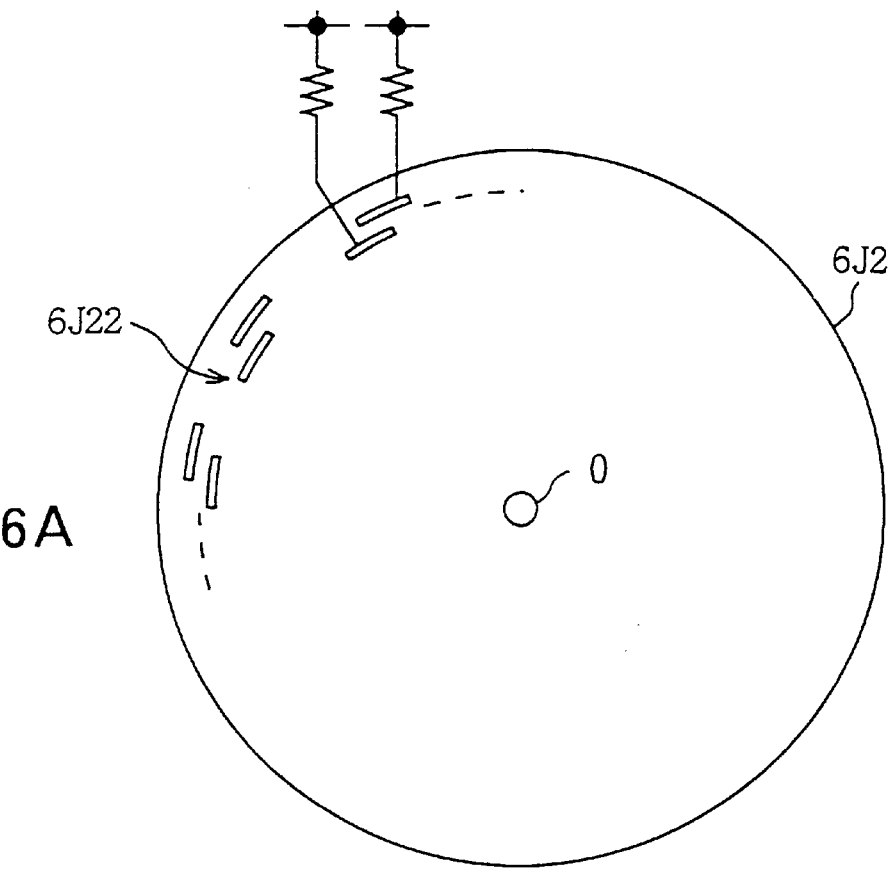
FIGS. 6A and 6B are schematic diagrams showing the configuration of a rotary encoder.
Figure 6B:
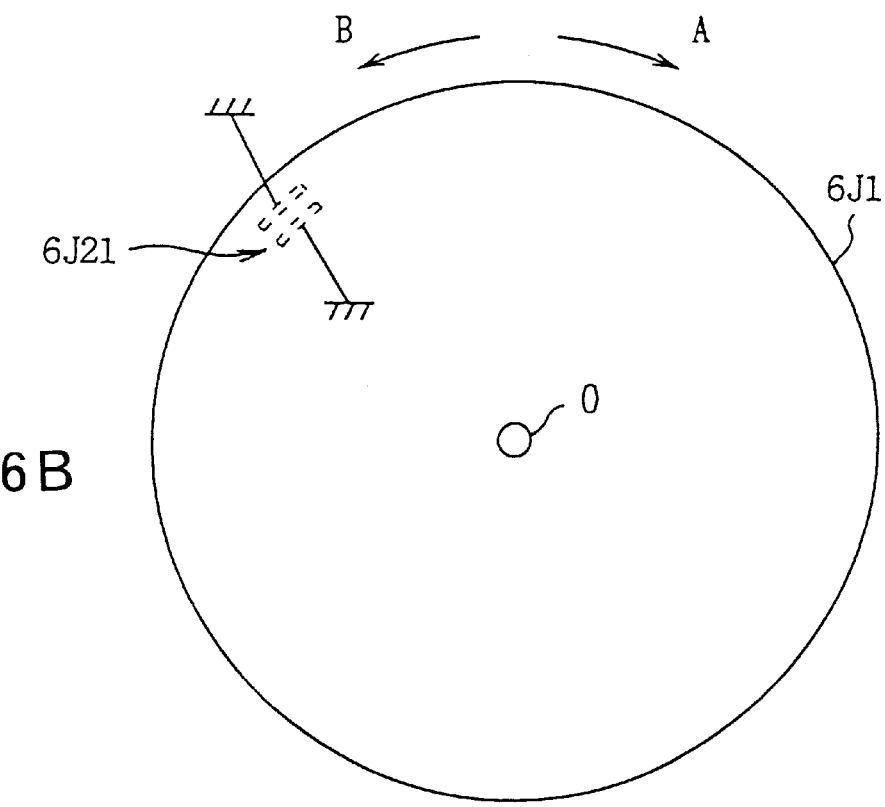

As shown in FIGS. 6A and 6B, the rotary encoder to slide together with the slide plate as a unit comprises two discs 6J1 and 6J2. Out of them, the disc 6J1 is a movable member laminated on the top face of the disc 6J2 and is attached to the disc 6J2 so as to be relatively rotatable. Here, on the movable disc 6J1, a pair of opposed electrodes 6J21 is provided. These opposed electrodes 6J21 are so arranged as that they can come into slide contact with twenty pairs of opposed electrodes 6J22 provided along the circumference of the disc 6J2 when assembled. Incidentally, the opposed electrodes 6J22 provided on the fixed disc 6J2 are formed to slightly shifted between the inner and the outer circumferential sides.

Figure 7A:
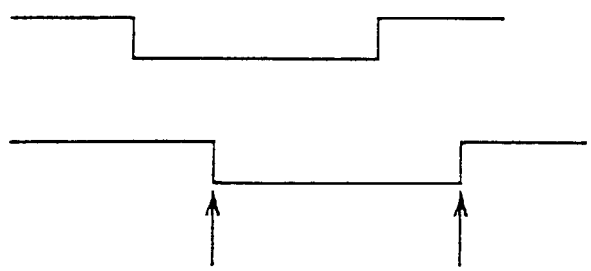
FIGS. 7A and 7B are output waveform charts showing the output waveform from a rotary encoder.
Figure 7B:
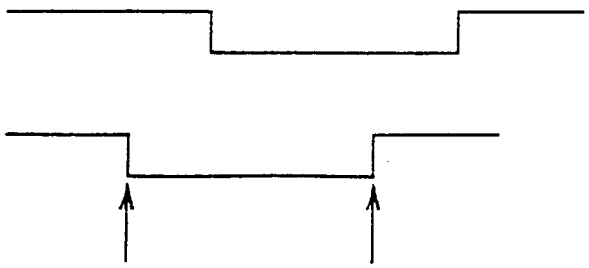

Thus, when the jog dial 6J is turned in the direction of the arrow A, the inner-circumference potential outputted from the opposed electrodes 6J22 falls earlier down to the ground potential than the outer-circumference potential as shown in FIG. 7A, whereas the outer-circumference potential outputted from the opposed electrodes 6J22 falls earlier down to the ground potential than the inner-circumference potential as shown in FIG. 7B when the jog dial 6J is turned in the direction of the arrow B. Use of this has enabled the rotating direction to be detected in the jog dial 6J by detecting which of the inner-circumference and the outer-circumference potentials falls earlier.

Subsequently, a representative manipulation example using the jog dial 6J will be described. First, by the UP or Down manipulation of the jog dial 6J in the circumferential direction under the circumstances that various list screens are displayed on the LCD 5, it becomes possible to move the cursor displayed on the relevant LCD 5 upward or downward. In this case, pushing the jog dial 6J in the radial direction (hereinafter, referred to as click) under these circumstances will enable the item at which the cursor is positioned to be decided and read of detailed information related to the item to be instructed to the CPU 7.

Furthermore, the equipment is so arranged that a rotating manipulation of the jog dial 6J in the circumferential direction during the communication enables the volume of the received voice to be adjusted, whereas a click of the jog dial 6J during the communication enables the mute to be implemented.

(2) Making a control command

Here, the cellular phone equipment 1 is a communication terminal according to the normal standard of a GSM system and can make use of various additional services provided by the network side of a GSM system. In this item, a making method for various commands transmitted in utilizing the additional services will be described.

First, the cellular phone equipment 1 is so arranged that manipulating the menu key 6G allows various menu items to be displayed on the LCD 5. After selecting the items concerning the making method for a control command by manipulating the jog dial 6J under these circumstances, a click manipulation of the jog dial 6J allows the control-command making screen to be displayed on the LCD 5 in turn.

The cellular phone equipment 1 is so arranged that input of a predetermined type of information in accordance with the instruction displayed on the screen while successively selecting desired items in accordance with the screen display after displaying this control-command making screen enables the target control command to be easily made up. Accordingly, with the cellular phone equipment 1, a worrisome trouble involved as conventional in the making of a control command cannot only be omitted but the additional services provided can also be utilized by accurately making a control command.

Here, referring to screen image drawings, a making method for a control command in the cellular phone equipment 1 will be described hereinafter.

As shown in FIG. 8A, in the cellular phone equipment 1, time of the day, date and operator name are displayed on the screen of the liquid crystal display 5 in the normal mode. Manipulating the menu key 6G under these circumstances allows various menu items to be displayed. After selecting the item concerning a control-command making method out of the menu items by manipulating the jog dial 6J, a click manipulation of the jog dial 6J allows a control-command as shown in FIG. 8B to be displayed in turn.

In the control-command making screen, control commands of activation, deactivation, interrogation, registration and erasure to be used in utilizing additional services are listed and displayed. To be specific, characters of "Activate", "Deactivate", "Interrogate", "Register" and "Erase" representing the respective control commands are displayed in list on the screen. In this case, since the second line to the fourth line in the screen are used for the list display of control commands, in practice, three of the five control commands are simultaneously displayed as shown in FIG. 8B.

Under these circumstances, UP or DOWN manipulation of the jog dial 6J will make the cursor indicating the selected item at present (white-and-black inverted portion on the screen, indicated with hatched with hatched lines in this drawing) move upward and downward in response to the manipulation. Meanwhile, if UP or DOWN manipulation of the jog dial 6J extends to a control command not shown at present on the screen, the relevant control command is displayed on the screen by successively shifting the control command list upward or downward and thereafter the cursor is displayed at the control command.

After joining the cursor to the control command to be set by using the jog dial 6J, a click manipulation makes the relevant control command decided. In this way, the first character of the command code in the relevant control command is automatically inputted and that character is displayed in the first line of the screen. Also, at this time, the names of additional service to be set are listed and displayed.

For example, if the cursor is joined to the activation and a click manipulation is performed, the activation is selected. As a result, "*", the first character of the command code of the activation is automatically inputted, and "*" is displayed in the first line of the screen as shown in FIG. 8C. And at the same time, to allow a user to select the additional service to be set by the activation command, names of additional services, such as "Number Notification", "Non-conditional Receive Transfer" and "Busy Receive Transfer", are listed. Incidentally, in practice, "Call ID Present", "Call Fwd", "Call Fwd Busy" and the like representing those additional services are displayed as shown in FIG. 8C.

Meanwhile, also in this case, since the second line to the fourth line in the screen are used for the list display of control commands, three out of the additional services are simultaneously displayed. In addition, if UP or DOWN manipulation of the jog dial 6J extends to a control command not shown at present on the screen, the relevant control command is displayed on the screen by successively shifting the control command list upward or downward and thereafter the cursor is displayed at the control command.

After joining the cursor to the additional service to be set by UP or DOWN manipulation of the jog dial 6J, a click manipulation makes the service code representing the relevant additional service automatically inputted and the service code is displayed subsequent to the "*" mentioned earlier in the first line on the screen.

For example, if the cursor is joined to "Non-conditional Receive Transfer" and a click manipulation is performed, "Non-conditional Receive Transfer" is selected. As a result, "21", service code of "Non-conditional Receive Transfer" is automatically inputted and the service code "21" is displayed in the first line of the screen as shown in FIG. 8D. Incidentally, in this case, the separate character ("*") representing the boundary with the supplementary index to be subsequently set is also inputted and that displayed in the first line of the screen. Thus, as the command code displayed in the first line of the screen, "*21*" appears in the end.

At this time, in the second line of the screen, characters "Input Dist No" is displayed in a small font as the character instructing a user to input the transfer telephone number, supplementary index for "Non-conditional Receive Transfer". When a user begins to input the destination telephone number with the numeric keys 6B on seeing this instruction, the telephone number inputted is displayed in a large font by using the third and fourth lines of the screen as shown in FIG. 8E. After the completion of inputting the transfer telephone number, depressing the "*" key 6D leads to the decision of the transfer telephone number. In this way, as shown in FIG. 8F, the transfer telephone number "12345678" and the separate character "*" are displayed subsequent to the former *21* in the first line of the screen. Incidentally, at that time, a click manipulation of the jog dial 6J can also lead to the decision of the transfer telephone number. When the transfer telephone number is made definite by using the jog dial 6J like this, the separate character "*" is automatically added. Alternatively, when a click manipulation or depress of the "*" key 6D is performed without inputting the transfer telephone number, the transfer telephone number is omitted and the procedure proceeds to the subsequent input of a basic service group.

When the transfer telephone number is made definite by using the "*" key 6D or the jog dial 6J, as shown in FIG. 8F, names of basic service groups to be set subsequently are listed on lines second-fourth on the screen. Incidentally, in the case of "Non-conditional Receive Transfer", the basic service groups include "All teleservices", "Telephony" and "All data service" and names of these items are listed.

When the cursor is joined, for example, to "All teleservices" among these basic service groups and a click manipulation is performed, "All teleservices" is made definite. In this way, the code "1" representing "All teleservices" is automatically inputted and "1" is displayed subsequent to the former "*21*12345678*" in the first line of the screen as shown in FIG. 8G. In the case of "Non-conditional Receive Transfer", since a basic service group is the last parameter, all parameters could be inputted with this. Incidentally, "#" representing the tail of a command code is attached to the end of a control command and the cellular phone equipment 1 is so arranged that this "#" is automatically attached at the time point of inputting the last parameter. Thus, when a basic service group is made definite, "#" is automatically inputted and finally the command code for activation comprising "*21*12345678*1#" is displayed in the first line of the screen.

Like these, in the cellular phone equipment 1, if continuing to input predetermined types of information in accordance with the instruction displayed on the LCD 5 while successively selecting items displayed on the LCD 5, one can make up a desired control command. In addition, the made control command is displayed on the LCD 5 so that a user can check it.

After making of the control command ends in this manner, the control command is fed to the sending/receiving circuit section 10 on depressing the send key 6E. The sending/receiving circuit section 10 modulates the control command in a predetermined signal form and sends it over a predetermined wireless channel from the antenna 11 to the base station equipment. In this way, the control command is sent to the network side.

While a control command is sent like this, as shown in FIG. 8E, the character, "sending" indicating during-sending, is displayed on the screen. By this display, a user can become aware that a control command is being sent at present.

Thereafter, when the response signal of setting completion is sent from the network side, the letter, "succeeded", is displayed on the screen of the LCD 5 as shown in FIG. 8I. By this display, a user can become aware that the setting is completed. In addition, simultaneously with this display, the cellular phone equipment 1 starts a predetermined timer. And, on recognizing from the timer that a predetermined time has elapsed after the display of "succeeded", a user switches the screen to the screen of normal mode as shown in FIG. 8J.

Meanwhile, the control-command making screen described above is implemented with the display control of the LCD 5 by the CPU 7. Also the making of a control command is carried out by the CPU 7 on the basis of the items selected and the predetermined types of information inputted by a user.

(3) Operation and Advantages

Figure 9:
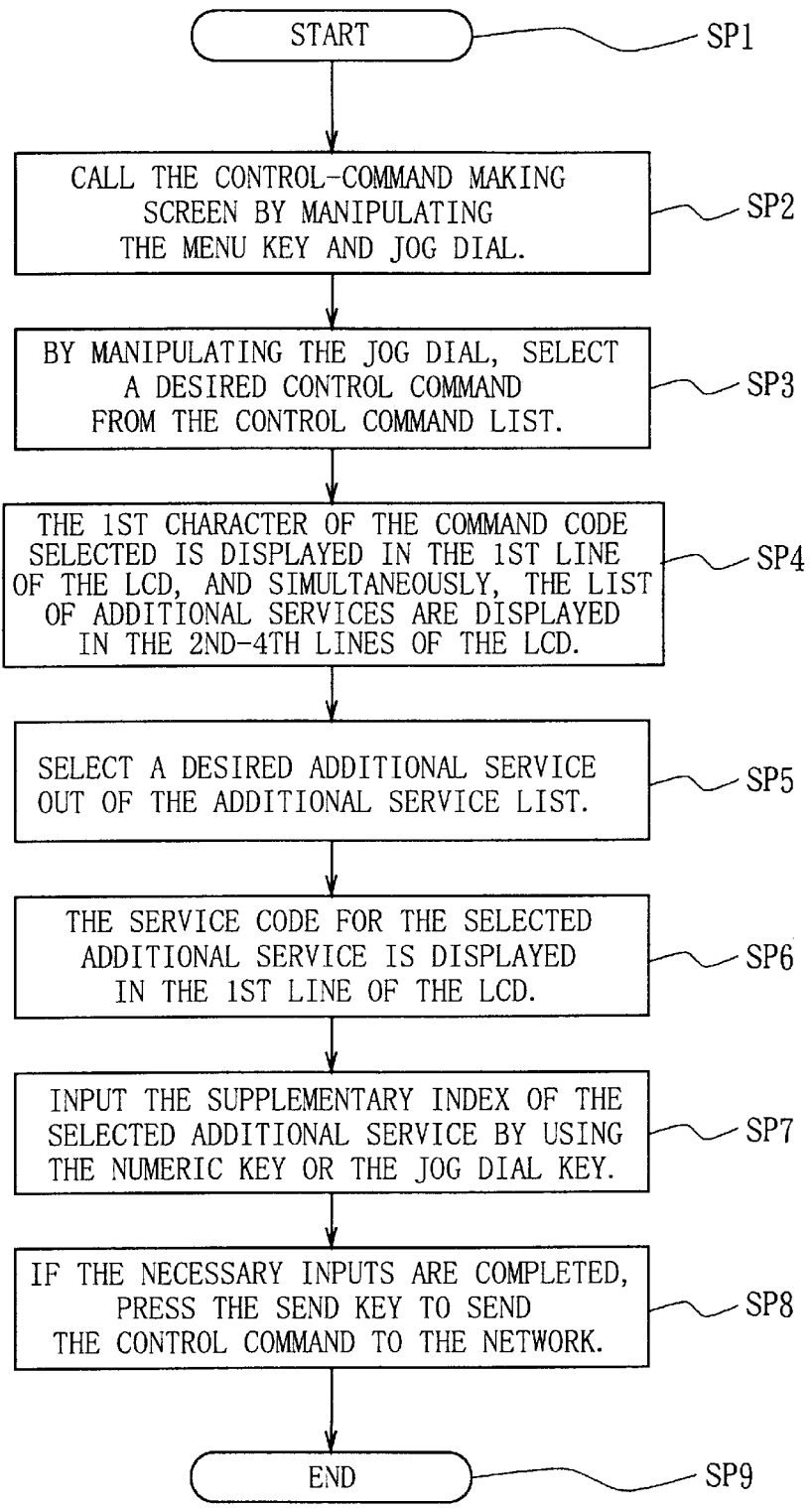
FIG. 9 is a flow chart showing the procedure for making a control command.

With the above arrangement, in the cellular phone equipment 1, a control command can be made up according to the manipulation procedure as shown in FIG. 9. To be specific, at step SP2 entered from step SP1, first, the control-command making screen is called by manipulating the menu key 6G and jog dial 6J. By this manipulation, first of all, various control commands of the control-command making screen are listed on the screen of the LCD 5.

Next, at step SP3, by manipulating the jog dial 6J, a desired control command is selected from the control commands displayed. Thereby, the first character of the command code for the selected control command is automatically inputted and at the next step SP4, the relevant first character of the command code is displayed in the first line of the LCD 5. Simultaneously with this, additional services are listed in the second line to the fourth line of the LCD 5.

At the next step SP5, by manipulating the jog dial 6J again, a desired additional service is selected out of the additional service list. In other words, the additional service to be set by the control command selected previously is selected. Thereby, the service code of this additional service is automatically inputted and at step SP6, the relevant service code is displayed in the first line of the LCD 5.

At the next step SP7, supplementary indices of the selected additional service are inputted by manipulating the numeric key 6B or the jog dial key 6J. For example, the password and transfer number are inputted from the numeric keys 6B according to the input instruction, while a basic service group is inputted by selecting from the list displayed on the LCD 5 with the jog dial 6J.

After input of the supplementary index is completed in this manner, the procedure proceeds to the subsequent step SP8 and by pressing the send key 6E, the made-up control command is sent to the network. Incidentally, "#" representing the last of the control command is automatically inputted the moment input of the supplementary index is completed.

Like this, the cellular phone equipment 1 successively displays predetermined items on the LCD 5 to allow a user to select them, moreover if there is a type of information having to be inputted by a user, displays characters as instructing the input operation on the LCD 5 to allow a user to input the relevant type of information and automatically makes up a control command on the basis of the selected results and the inputted types of information. Thereby, a user can make up a control command only by inputting predetermined types of information in accordance with the instructions displayed while successively selecting predetermined items in accordance with the screen displayed on the LCD 5. Thus, even if the respective codes of control commands not kept in mind. Use of the cellular phone 1 would enable a control command to be accurately and easily made and an additional service to be securely utilized.

According to the above arrangement, predetermined items are successively displayed on the LCD 5 to allow a user to select, moreover if there is a type of information that has to be inputted by a user, characters as instructing the input operation are displayed on the LCD 5 to allow a user to input the relevant type of information and a control command is automatically made up on the basis of the selected results and inputted information, so that, if a user continues to operate according to the instructions of the LCD 5, a user can accurately and easily make a control command even if he keeps no respective codes of control commands in mind.

(4) Other embodiments

Meanwhile, in the above embodiment, a case where a control command is so arranged as to be sent by depressing the send key 6E has been described. However, the present invention is not limited to this case and a control command can be automatically sent the moment the control command has been made up.

In addition, in the above embodiment, a case where after the completion of making a control command, simply input of the send key 6E is waited has been described. However, the invention is not limited to this case and characters having the content, "Press the send key if the control command is valid", can be displayed.

Further, in the above embodiment, a case where after the completion of making a control command, only the control command made is displayed has been described (cf. Fig, 8G). however, the preset invention is not limited to this and it can be explicitly indicated to a user by displaying the characters, meaning "completion of input", that all information types needed for making of a control command has finished inputting.

Further, the above embodiment has dealt with a case where when a response signal is sent from the network side after sending a control command, the control result is expressed by displaying the characters, "succeeded". However, the preset invention is not limited to this and it can be expressed by displaying the characters, for example, "Call Fwd succeeded", which setting was completed.

Further, the above embodiment has dealt with a case where the jog dial 6J is used to select and decide a displayed item. However, the preset invention is not limited to this and other input means can be used if being means capable of inputting the direction and moved amount for moving the cursor in a predetermined direction and definite information for deciding the item indicated by the cursor.

For example, a jog shuttle with the click function in which the rotating angle is limited to a predetermined angle, a track ball with the click function or a joy stick with the click function can be used.

Further, the above embodiment has dealt with a case where predetermined characters are displayed to instruct a user the input of information. However, the present invention is not limited to this and symbols, picture characters, numerals or the like can be displayed to instruct a user the input of information. The point is that any other may be displayed if understood to instruct the input.

Further, the above embodiment has dealt with a case where the CPU 7 is provided to allow the LCD 5 to display the instruction for the input of a predetermined item or a predetermined information type and make up a control command on the basis of the relevant selected result and predetermined information type inputted. However, the present invention is not limited to this and an effect similar to that of the above-mentioned case can be obtained if control means not only for successively displaying predetermined items on display means to allow a user to successively select and decide desired items but also for displaying the input instruction of a predetermined information type on display means to allow the user to input a predetermined information type, thereby making up and sending a control command on the basis of the relevant selected result and the predetermined information type are provided.

Furthermore, the above embodiment has dealt with an applied case of the present invention to a cellular phone equipment 1 according to the standard of a GSM system. However, the present invention is not limited to this and is widely applicable to other communication terminal equipment if being equipment for sending a control command in utilizing an additional service provided from the network side.

As mentioned above, according to the present invention, on account of the provision of control means not only for successively displaying predetermined items to allow a user to select and decide desired items but also for displaying the input instruction of a predetermined information type to allow the user to input a predetermined information type, thereby making up a control command on the basis of the relevant selected result and the predetermined information type, a user can accurately and easily make up a control command only by inputting the instructed type of information while successively selecting desired items.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A cellular telephone for controlling use of predetermined types of services provided from a network side by sending a predetermined control command, comprising:

display means for displaying predetermined items of said predetermined types of services and for displaying an input direction for directing a user to input a predetermined type of information;

first input means for selecting any one of said predetermined items displayed on said display means;

second input means including at least alphanumeric keys responsive to said input direction displayed on said display means for inputting said predetermined type of information; and control means for successively displaying said predetermined items on said display means to allow said user to successively select any one of said predetermined items by manipulating said first input means, and when said predetermined type of information relating to said selected one of said predetermined items is needed to be inputted, for displaying said input direction to direct said user to input said predetermined type of information by manipulating said second input means, thereby making up and sending said control command on a basis of said one of said selected predetermined items and said predetermined type of information inputted by said user.

2. The cellular telephone according to claim 1, wherein said control means displays said control command made up on the basis of said one of said selected predetermined items and said predetermined type of information.

3. The cellular telephone according to claim 1, wherein said control means displays said predetermined type of information indicating during—sending on said display means when sending said control command.

4. The communication terminal equipment according to claim 1, wherein said control means displays on said display means a control result of said additional services performed by said control command.

5. The cellular telephone according to claim 1 wherein said display means displays a cursor representing an item selected at present, and said first input means is arranged for said user to input a direction and a moved amount for said cursor to move in a predetermined direction and a decisive type of information for deciding said item represented by said cursor.

6. The cellular telephone according to claim 1, wherein said second input means includes operation keys for inputting numerals and characters.

7. A method of using a cellular telephone for controlling use of predetermined types of services provided from a network side by sending a predetermined control command, comprising the steps of:

displaying predetermined items of said predetermined types of services and displaying an input direction for directing a user to input a predetermined type of information by display means;

selecting any one of said predetermined items displayed on said display means by first input means;

inputting said predetermined type of information responsive to said input direction displayed on said display means by second input means including at least alphanumeric keys; and successively displaying said predetermined items on said display means to allow said user to successively select one of said predetermined items by manipulating said first input means, and when said predetermined type of information relating to said selected one of said predetermined items is needed to be inputted, displaying said input direction of said predetermined type of information on said display means to direct said user to input said predetermined type of information by manipulating said second input means, by control means, thereby making up and sending said control command on a basis of said one of said predetermined items and said predetermined type of information.

8. The method of using a cellular telephone according to claim 7, wherein said control means displays said control command made up on the basis of said selected one of said predetermined items and said predetermined type of information.

9. The method of using a cellular telephone according to claim 7, wherein said control means displays said predetermined type of information indicating during-sending con said display means when sending said control command.

10. The method of using a cellular telephone according to claim 7, wherein said control means displays on said display means a control result of said additional services performed by said control command.

11. The method of using a cellular telephone according to claim 7, wherein said display means displays a cursor representing one of said predetermined items selected at present, and said first input means is arranged for said user to input a direction and a moved amount for said cursor to move in a predetermined direction and a decisive type of information for deciding said item represented by said cursor.

12. The method of using a cellular telephone according to claim 7, wherein said step of inputting includes operating operation keys for inputting numerals and characters.

* * * * *